(12) United States Patent
Suzuki et al.

(10) Patent No.: US 10,556,307 B2
(45) Date of Patent: Feb. 11, 2020

(54) MACHINE TOOL

(71) Applicant: MAKINO MILLING MACHINE CO., LTD., Tokyo (JP)

(72) Inventors: Toshihiro Suzuki, Aiko-gun (JP); Shinji Terakawa, Aiko-gun (JP); Kenichiro Suzuki, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 0 days.

(21) Appl. No.: 15/764,022

(22) PCT Filed: Sep. 30, 2015

(86) PCT No.: PCT/JP2015/077799
§ 371 (c)(1),
(2) Date: Mar. 28, 2018

(87) PCT Pub. No.: WO2017/056255
PCT Pub. Date: Apr. 6, 2017

(65) Prior Publication Data
US 2018/0272483 A1 Sep. 27, 2018

(51) Int. Cl.
*B23Q 11/00* (2006.01)
*B23C 1/14* (2006.01)
(Continued)

(52) U.S. Cl.
CPC ............ *B23Q 1/015* (2013.01); *B23Q 1/48* (2013.01); *B23Q 1/488* (2013.01); *B23Q 1/5437* (2013.01);
(Continued)

(58) Field of Classification Search
CPC ............ B23Q 11/0046; B23Q 11/0042; B23Q 11/0057; B23Q 11/0053; B23Q 16/02;
(Continued)

(56) References Cited

U.S. PATENT DOCUMENTS 6,682,276 B2 * 1/2004 Harami ................ B23Q 1/4857
160/202
7,621,031 B2 * 11/2009 Kawai .................. B23Q 1/4852
198/346.1
(Continued)

FOREIGN PATENT DOCUMENTS

| CN | 101112745 | 1/2008 |
| JP | 1-146631 | 6/1989 |

(Continued)

OTHER PUBLICATIONS

WO-2006072356-A1 Machine Translation, pp. 1-2 (Year: 2019).*
(Continued)

*Primary Examiner* — Nicole N Ramos
(74) *Attorney, Agent, or Firm* — Morrison & Foerster LLP

(57) ABSTRACT

A machine tool includes a trough which collects chips; a mobile unit which is located above the trough and moves in the longitudinal direction of the trough on a bed, is configured from a first beam member, a second beam member, and a connecting member connecting the first beam member and the second beam member, and is formed with a hollow that opens toward the trough from above; a first guide which supports the mobile unit in such a manner that the mobile unit is movable in the longitudinal direction of the trough; a second guide which faces the first guide across the trough, and supports the mobile unit in such a manner that the mobile unit is movable in the longitudinal direction of the trough; and a cradle, both ends of which are supported by the first beam member and the second beam member.

4 Claims, 7 Drawing Sheets

(51) Int. Cl.
  *B23C 1/06*  (2006.01)
  *B23Q 1/01*  (2006.01)
  *B23Q 1/54*  (2006.01)
  *B23Q 1/48*  (2006.01)

(52) U.S. Cl.
  CPC ............ B23Q 11/0053 (2013.01); *B23C 1/06* (2013.01); *B23C 1/14* (2013.01); *B23Q 2220/006* (2013.01)

(58) Field of Classification Search
  CPC ........ B23Q 16/022; B23Q 1/015; B23Q 1/48; B23Q 1/488; B23Q 1/5437; B23Q 2220/006
  USPC ....... 409/202, 212, 235, 137, 145, 159, 163, 409/165, 167, 172
  See application file for complete search history.

(56) References Cited

U.S. PATENT DOCUMENTS

| | | | | |
|---|---|---|---|---|
| 8,181,321 | B2 * | 5/2012 | Tullmann | B23Q 1/44 269/58 |
| 8,769,791 | B2 * | 7/2014 | Kawada | B23Q 1/015 29/281.1 |
| 8,899,889 | B2 * | 12/2014 | Yoshida | B23Q 1/4857 269/55 |
| 2008/0070186 | A1 * | 3/2008 | Steger | A61C 13/0009 433/75 |
| 2008/0175684 | A1 | 7/2008 | Schmidt et al. | |
| 2009/0238655 | A1 | 9/2009 | Schmidt et al. | |
| 2010/0003098 | A1 | 1/2010 | Faigle et al. | |
| 2010/0313718 | A1 | 12/2010 | Meidar et al. | |
| 2011/0070044 | A1 | 3/2011 | Kawada et al. | |
| 2013/0207331 | A1 | 8/2013 | Jung et al. | |

FOREIGN PATENT DOCUMENTS

| | | | |
|---|---|---|---|
| JP | 9-309042 | 12/1997 | |
| JP | 2002-126972 | 5/2002 | |
| JP | 2008-23709 | 2/2008 | |
| JP | 2013-158908 | 8/2013 | |
| JP | 2013-169617 | 9/2013 | |
| JP | 2015-51493 | 3/2015 | |
| WO | WO-2006072356 A1 * | 7/2006 | ........... B23Q 1/5437 |
| WO | 2009144831 | 12/2009 | |

OTHER PUBLICATIONS

International Search Report dated Nov. 10, 2015, directed to PCT Application No. PCT/JP2015/077799; 2 pages.

"HSC 600," (Aug. 2007), exeron GmbH; 4 pages.

"HSC Line General Overview," (Mar. 2013), exeron GmbH; 12 pages.

* cited by examiner

PRIOR ART

PRIOR ART

MACHINE TOOL

CROSS-REFERENCE TO RELATED APPLICATION

This application is a U.S. National phase patent application of International Patent Application No. PCT/JP2015/077799, filed Sep. 30, 2015, the contents of which is hereby incorporated by reference in the present disclosure in its entirety.

FIELD OF THE INVENTION

The present invention relates to a machine tool for machining a workpiece by relatively moving a tool and the workpiece. In particular, the present invention relates to a machining center or the like having good swarf dischargeability and good operator accessibility without a reduction in rigidity.

BACKGROUND OF THE INVENTION

Patent Literature 1 discloses a five-axis vertical machining center, as shown in FIG. 1. This prior art machining center includes a bed 13 as a base, a column 15 mounted on the bed 13, a rotary table 35 arranged on a moving body 27 which moves left and right on the bed 13, a spindle head 21 supporting a spindle 25, and a saddle 17 supporting the spindle head 21 so as to be vertically movable in the Z-axis direction on the left side face of the column 15. A pair of rails 29a and 29b are provided in the bed 13, and the moving body 27 is provided so as to be capable of reciprocating in the lateral direction on the bed 13 along the rails 29a and 29b. At least a part of the moving body 27 can enter a tunnel portion 15c of the column 15.

As shown in FIG. 2, the moving body 27 includes a pair of supports 27a and 27b and is formed in a substantially U-shape. A cradle 33 is rotatably supported by the supports 27a and 27b of the moving body 27 through pivot shafts 31a and 31b. A rotary table 35 on which the workpiece is attached is mounted on the rotary table 35. When machining the workpiece fixed to the rotary table 35, the moving body 27 naturally accumulates swarf in region S in FIG. 2, and there is a problem with swarf dischargeability. Furthermore, in the prior art, since it is necessary that a swarf outlet be provided in the front side of the bed, when swarf is collected and cleaned, the swarf outlet is spaced away from the deposition location of the swarf, requiring additional time and effort.

Patent Literatures 2 and 3 disclose an invention in which a trough for the discharge of swarf is provided below a workpiece table. Since the linear feed axis drive mechanism of the table is present in the trough under the workpiece table, structures such as a table cradle on which the workpiece table is mounted are present in the discharge area, hindering the discharge of swarf, resulting in swarf accumulation leading to poor dischargeability of swarf. Furthermore, Patent Literature 4 discloses a general-purpose machine tool in which a channel-shaped cut chip space is provided under a workpiece table. In this prior art, as a cantilevered tilt table is used, the rigidity of the tilt shaft rotating body is reduced due to the cantilevered structure and the workpiece is inclined such that workpiece falls down in the direction of the column, and the workpiece cannot be tilted toward the operator. Thus, the accessibility of the operator to the workpiece and the table is poor during swarf collection and cleaning.

PATENT LITERATURE

Patent Literature 1: WO 2009/144831
Patent Literature 2: JP-A-H09-309042
Patent Literature 3: JP-A-H01-146631
Patent Literature 4: JP-A-2013-158908

BRIEF SUMMARY OF THE INVENTION

The technical object of the present invention is to solve the above-mentioned problems of the prior art, and to provide a machine tool with good dischargeability of swarf without a reduction in rigidity.

In order to achieve the above objectives, the present invention provides a machine tool for machining a workpiece by performing relative rotation of a tool and the workpiece, comprising a trough provided in a bed and configured to collect swarf, a moving body which is located above the trough, moves on the bed in the longitudinal direction of the trough, is composed of a first beam member, a second beam member, and a connecting member configured to connect the beam members, and is formed with a cavity which opens from above toward the trough side, a first guide which is arranged on the bed in parallel to the longitudinal direction of the trough to guide the moving body in the longitudinal direction of the trough, a second guide which is arranged on the bed in parallel to the longitudinal direction of the trough and opposed to the first guide with respect to the trough, to guide the moving body in the longitudinal direction of the trough and a cradle including a workpiece table, the cradle being supported at both ends by the first beam member and the second beam member so as to be rotatable inside the cavity of the moving body through a rotating shaft which is parallel to the longitudinal direction of the trough.

According to the present invention, since a cradle including the workpiece table is supported in the cavity of the moving body, the swarf immediately after machining and the swarf accumulated on the workpiece table can fall directly into the trough without staying on the moving body. As a result, the cause of swarf accumulation can be eliminated while maintaining a structure in which both ends of the cradle are supported. Furthermore, because the workpiece table can tilt and pivot so that it is easy for the swarf to fall into the trough, it is possible to provide a machine tool that takes into consideration the accessibility of the operator at the time of cleaning.

DETAILED DESCRIPTION OF THE INVENTION

An embodiment of the present invention will be described below with reference to FIGS. 3 to 7.

Figure 3:
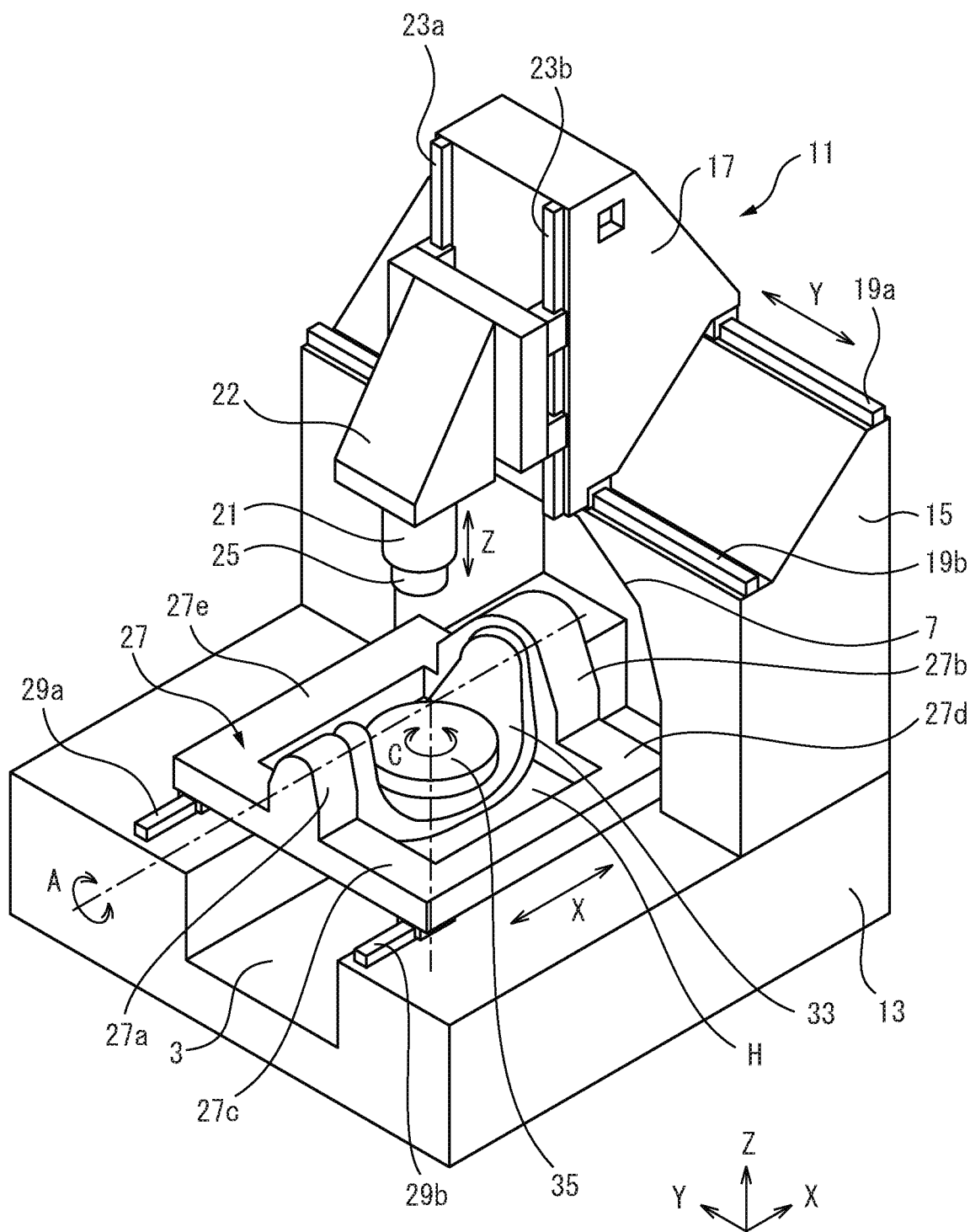
FIG. 3 is a perspective view of a machine tool according to an embodiment of the present invention.

According to the embodiment of the present invention, as shown in FIG. 3, the machine tool 11 includes, as main constituent elements, a bed 13 as a base, a trough 3 provided in the bed 13 and configured to collect swarf, a slant-shaped column 15 mounted on the bed 13, a saddle 17 arranged so as to be able to move back and forth on the column 15, a head stock 22 which moves vertically with respect to the saddle 17, a spindle head 21 supporting the spindle 25 so as to allow the spindle 25 to rotate around the vertical axis (Z-axis), and a moving body 27 which moves on the bed 13 in the left and right direction and which includes a rotary table 35. The configuration of the moving body 27 is described later. The spindle head 21 is mounted in the head stock 22, and a tool T (not shown) can be attached to the spindle 25.

In the present embodiment, as shown in FIG. 3, the rotary table 35 as a workpiece table can move in the X-axis direction corresponding to the left and right direction with respect to the bed 13. The Y-axis is defined as the direction perpendicular to both the X-axis direction and the Z-axis of the spindle 25. The moving body 27 includes a cradle 33 both ends of which are supported so as to be rotatable in the A-axis direction through a rotating shaft which is parallel to the X-axis. A rotary table 35 which is rotatable in the C-axis direction is provided in the cradle 33. Thus, the moving body 27 can move in the X-axis direction, which is the left and right direction of the bed 13, the saddle 17 can move in the Y-axis direction, which is the forward and backward direction, and the spindle head 21 can move in the Z-axis direction, which is the vertical direction. The C-axis and the A-axis are defined as usual. In this embodiment, the longitudinal direction of the trough 3 is the X-axis direction, which is the left and right direction with respect to the bed 13. The present invention may be a machine tool in which the X-axis may be defined as the forward and backward direction of the rotary table 35 and the Y-axis may be defined as the direction perpendicular to both the X-axis and the Z-axis. The workpiece table need not necessarily be a rotary table. A pallet P and the workpiece, etc., are attached to the table.

The top portion of the column 15 is inclined such that the top surface is formed in a slant shape, the machining area side of the column 15 is positioned on the lower side, and two linear guide rails are provided. As these rails, a first Y-axis guide 19a is provided on the upper side of the inclination of the column 15, and a second Y-axis guide 19b is provided on the lower side of the inclination of the column 15. A Y-axis feeding means is provided between the first Y-axis guide 19a and the second Y-axis guide 19b. The Y-axis feeding means includes a ball screw (not shown; mounted on the column) extending in the Y-axis direction and a Y-axis feed motor (not shown) connected to one end of the ball screw, and the saddle 17 includes a nut (not shown) which engages with the ball screw. This feeding means is hereinafter referred to as a "linear feed axis drive mechanism".

A pair of Z-axis guides 23a and 23b extend on the left side surface (the machining area side) of the saddle 17. The head stock 22 is attached to the saddle 17 so as to be able to reciprocate in the vertical direction on the Z-axis guides 23a and 23b. The saddle 17 and the head stock 22 are provided with a linear feed axis drive mechanism as a Z-axis feed means.

A rear-side first X-axis guide 29a and a front-side second X-axis guide 29b extend on the bed 13. The moving body 27 is mounted so as to reciprocate on the bed 13 along the first X-axis guide 29a and the second X-axis guide 29b. A linear feed axis drive mechanism 39 (refer to FIG. 6) as X-axis feeding means is installed between the bed 13 and the moving body 27 in a position in which the linear feed axis drive mechanism 39 does not overlap the trough 3. In other words, the linear feed axis drive mechanism 39 is installed on the bed between the trough 3 and the first X-axis guide 29a. The moving body 27 can partly enter the arch-shaped tunnel portion 7 formed in the column 15 by the linear feed axis drive mechanism 39.

Figure 6:
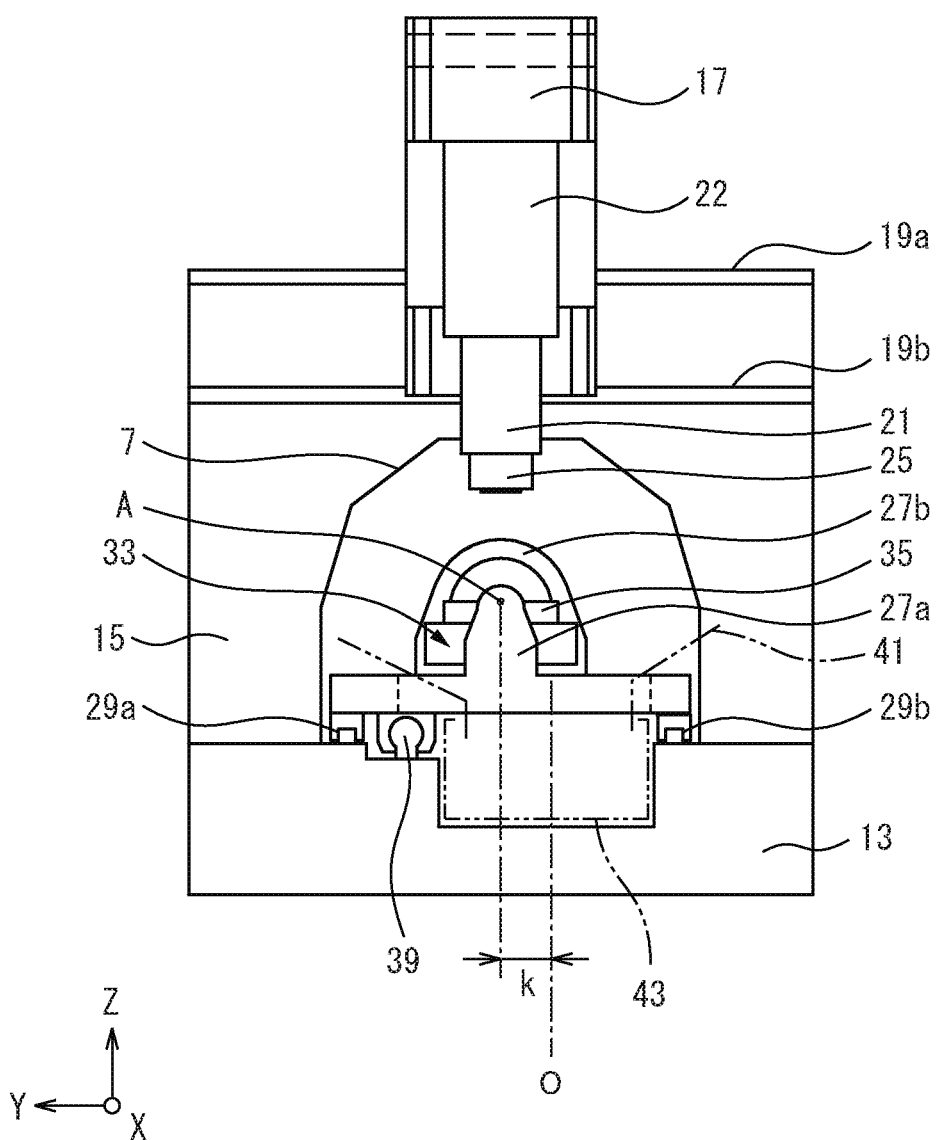
FIG. 6 is a side view of a machine tool according to an embodiment of the present invention.

The linear feed axis drive mechanism 39 is mounted on the back side of the moving body 27 in FIG. 6, but is not limited to this configuration. The linear feed axis drive mechanism 39 may be mounted on the front side, i.e., on the bed 13 between the second X-axis guide 29b and the trough 3, or may be installed on both sides. Mounting the linear feed axis drive mechanism 39 on the bed 13 between the rear-side first X-axis guide 29a and the trough 3 is more preferable in view of the dischargeability of swarf and the operability of the operator.

As shown in FIG. 3, the moving body 27 is composed a left-side first beam member 27c, a right side second beam member 27d, and front and rear connecting members 27e and 27e which connect the first beam member 27c and the second beam member 27d. The moving body 27 is composed of an approximate quadrangle (square shape) in which a cavity H is formed in the center, as viewed from above. In the present embodiment, the cavity H or a through-hole is formed in the center of the X-axis moving body 27, which moves in the left and right direction. The cradle 33, which rotates in the A-axis direction, is arranged above the "square" shaped opening. As a result, accumulated swarf can fall directly into the trough 3.

The trough 3 configured to collect the swarf in the X-axis direction is formed in the bed 13 in a groove shape having a sheet metal swarf receiver 43 incorporated therein (FIG. 6). The longitudinal direction of the trough 3 is parallel to the X-axis direction. In the present embodiment, the trough 3 is formed as a groove having a rectangular cross section, and the center plane of symmetry is defined as O. The cross-section of the trough 3 is not limited to a rectangle and may be any other shape. The cavity H at the center of the moving body 27 is open from the top to the trough 3 side, so that the swarf can fall directly into the trough 3. The supports 27a and 27b are attached integrally or separately to the left side first beam member 27c and the right side second beam member 27d of the moving body 27, respectively. The left side first beam member 27c includes the support 27a and the right side second beam member 27d includes the support 27b.

In the supports 27a and 27b of the moving body 27, the cradle 33 is supported by the pivot shafts 31a and 31b (FIG. 5) so as to be rotatable in the A-axis direction. The rotary table 35 configured to hold the workpiece and the pallet P is mounted on the cradle 33 so as to be rotatable in the C-axis direction. The front and rear connecting members 27e and 27e are installed so as to cover the first X-axis guide 29a and the second X-axis guide 29b and so as not to cover the trough 3. Slant covers 41 shown in FIG. 6 are provided on the front and rear connecting members 27e and 27e so that the swarf can be satisfactorily discharged. Similarly, slant covers 41, which are telescoping covers, are provided on the outside of the moving body 27 to cover the first X-axis guide 29a and the second X-axis guide 29b. In other words, the slant covers 41 configured to guide the swarf into the trough 3 are arranged so as to cover the linear feed axis drive mechanism 39, the first X-axis guide 29a, and the second X-axis guide 29b. Although telescoping covers have been described as an example of the slant covers 41 on the outside of the moving body 27, the slant covers 41 on the outside of the moving body 27 may be integral sheet metal covers fixed to the connecting members 27e and 27e, or may be winding type covers or bellows type covers.

Figure 1:
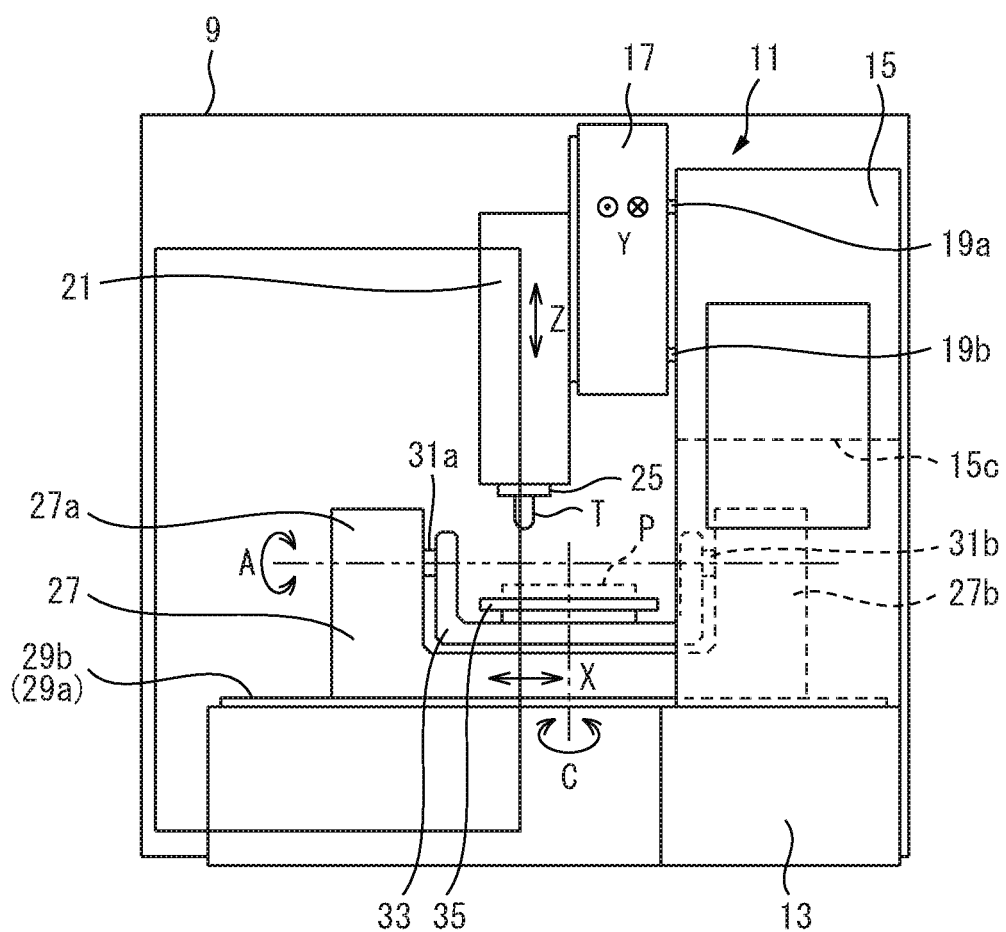
FIG. 1 is a front view of the prior art machine tool of Patent Literature 1.
Figure 2:
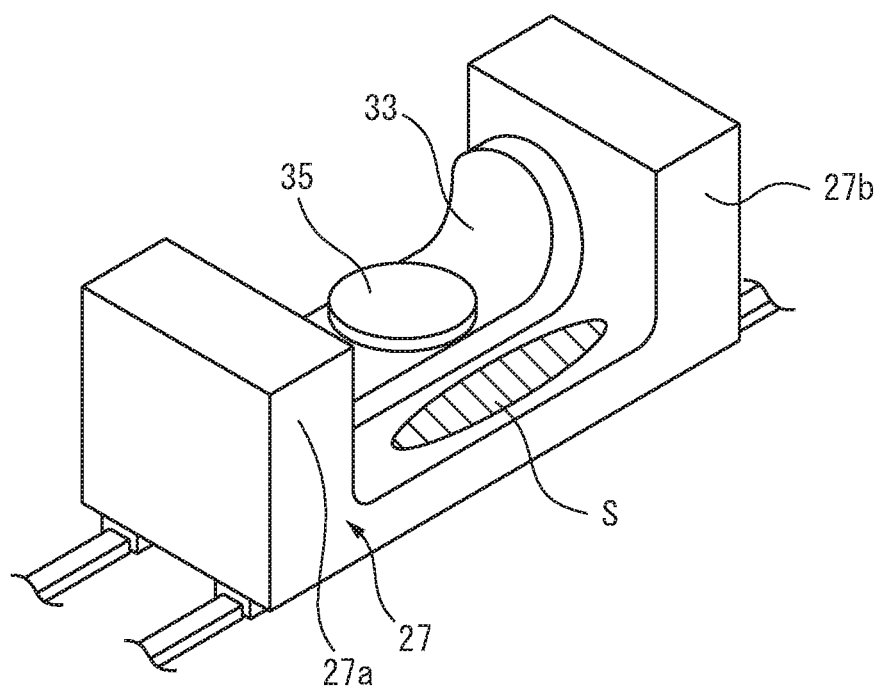
FIG. 2 is a perspective view of a moving body of the prior art.
Figure 7:
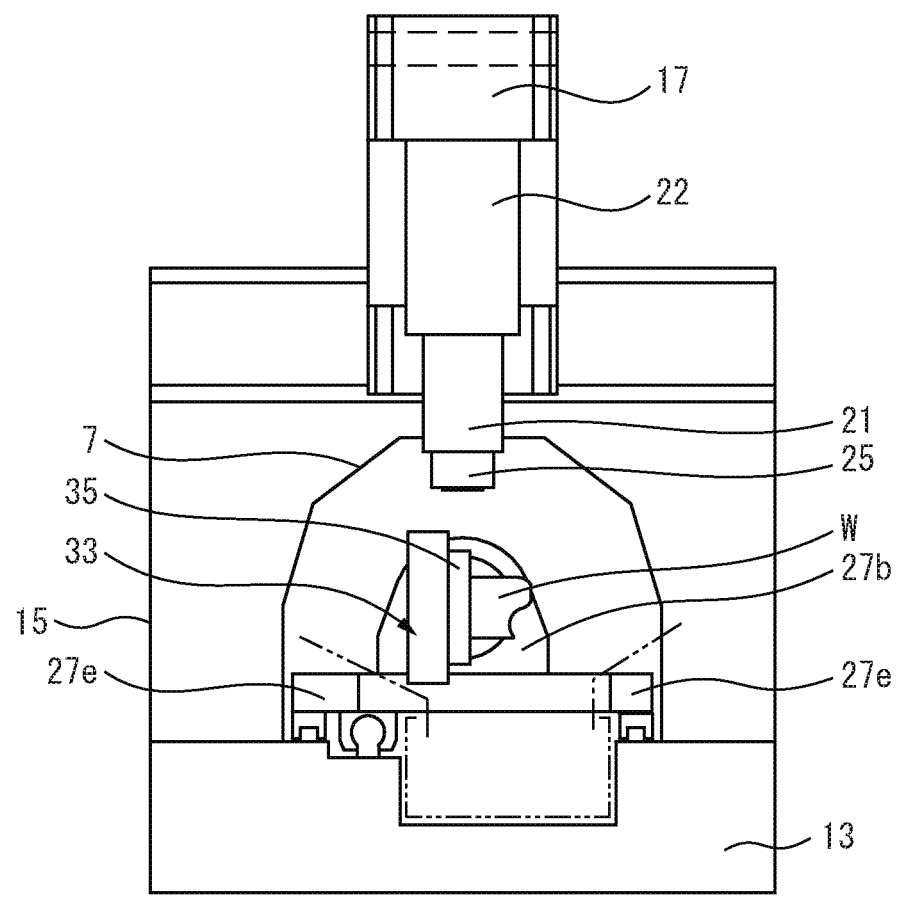
FIG. 7 is a side view of a machine tool according to an embodiment of the present invention, in which the A-axis has been rotated by 90.

Since the widths of the cradle 33 and the rotary table 35 are approximately the same, swarf does not accumulate, and drops directly into the trough 3. Thus, as shown in FIG. 2, swarf never accumulates in region S. Since the cradle 33 is supported by the pivot shafts 31a and 31b so as to be rotatable in the A-axis direction, the rotary table 35 on which the workpiece W is held can be rotated by about 90 to tilt toward the side near to the operator, as shown in FIG. 7. This makes it easier for the operator to clean the workpiece W, so that the swarf at the time of cleaning also drops directly near the center of the trough 3. The swarf drops into the swarf receiver 43 of the trough 3 along the slant cover 41 leading to the trough 3, and is then collected in a tank 47 by a conveyor (not shown) or blown air.

As shown in FIG. 6, the pivot shafts 31a and 31b which rotate the cradle 33 in the A-axis direction may be supported by the first beam member 27c and the second beam member 27d in such a way that the pivot shafts are offset (k of FIG. 6) toward the side opposite of the operator with respect to the center O (the center plane of symmetry) in the longitudinal direction of the trough 3. Since the center of rotation of the A-axis is shifted backward, the cavity H where the swarf falls is wider on the operator side. Further, it is preferable that the upper surface of the rotary table 35 be in the vicinity of the rotation center of the A-axis. As a result, as shown in FIG. 7, when the operator cleans the upper surface of the rotary table or the workpiece W, by inclining the A-axis 90 and bringing the workpiece W to the near side, the workpiece W is located near the center above trough 3, and the swarf falls directly into trough 3 when the swarf is swept away. In addition, such a configuration improves the accessibility of the operator. Further, since the center of rotation of the A-axis is shifted backwards so that the position of the center of gravity is shifted backwards, the distance between the center of gravity position and the linear feed axis drive mechanism 39 of the X-axis feed means is shortened, increasing mechanical rigidity.

Figure 4:
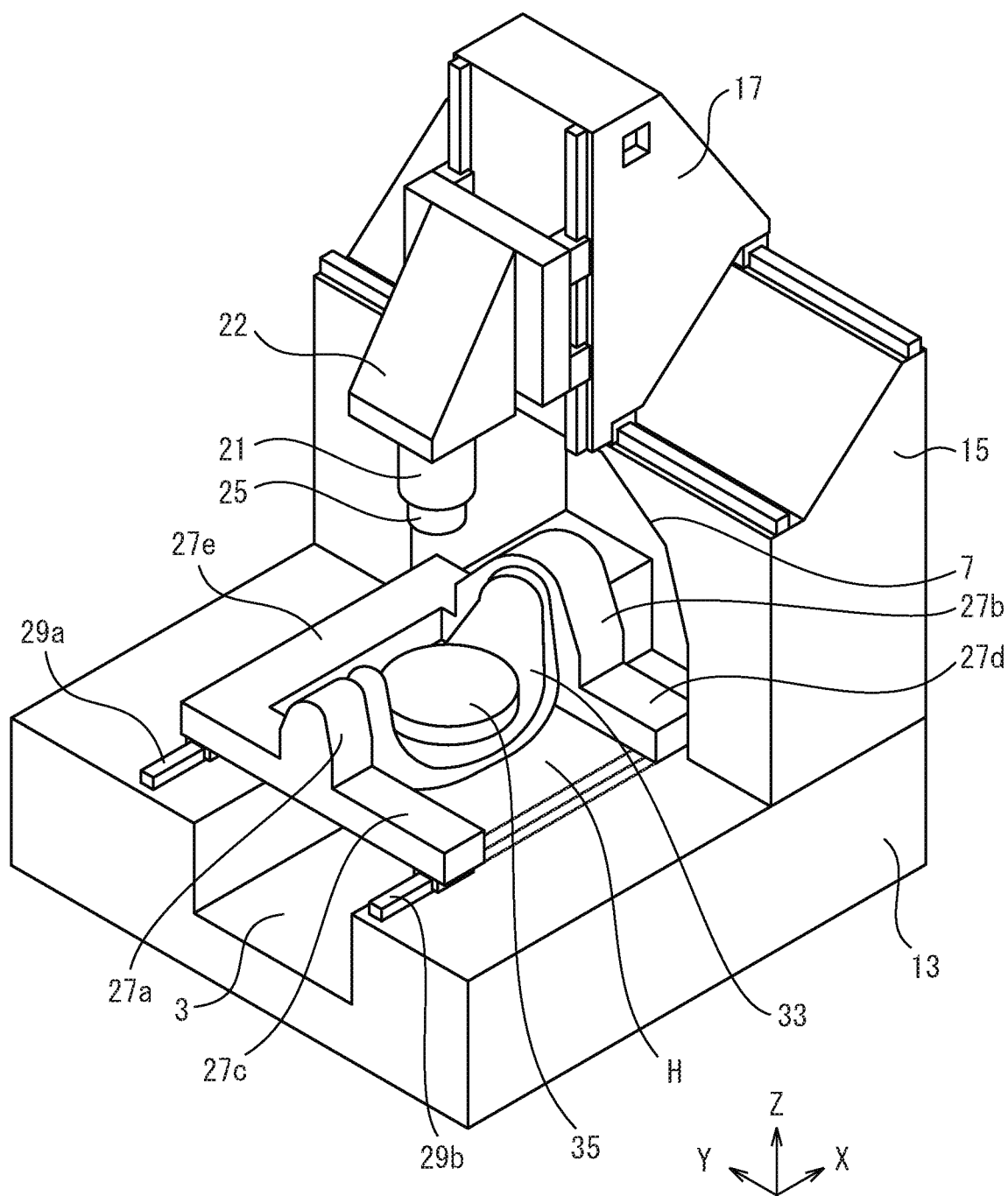
FIG. 4 is a perspective view of a machine tool according to an embodiment of the present invention.
Figure 5:
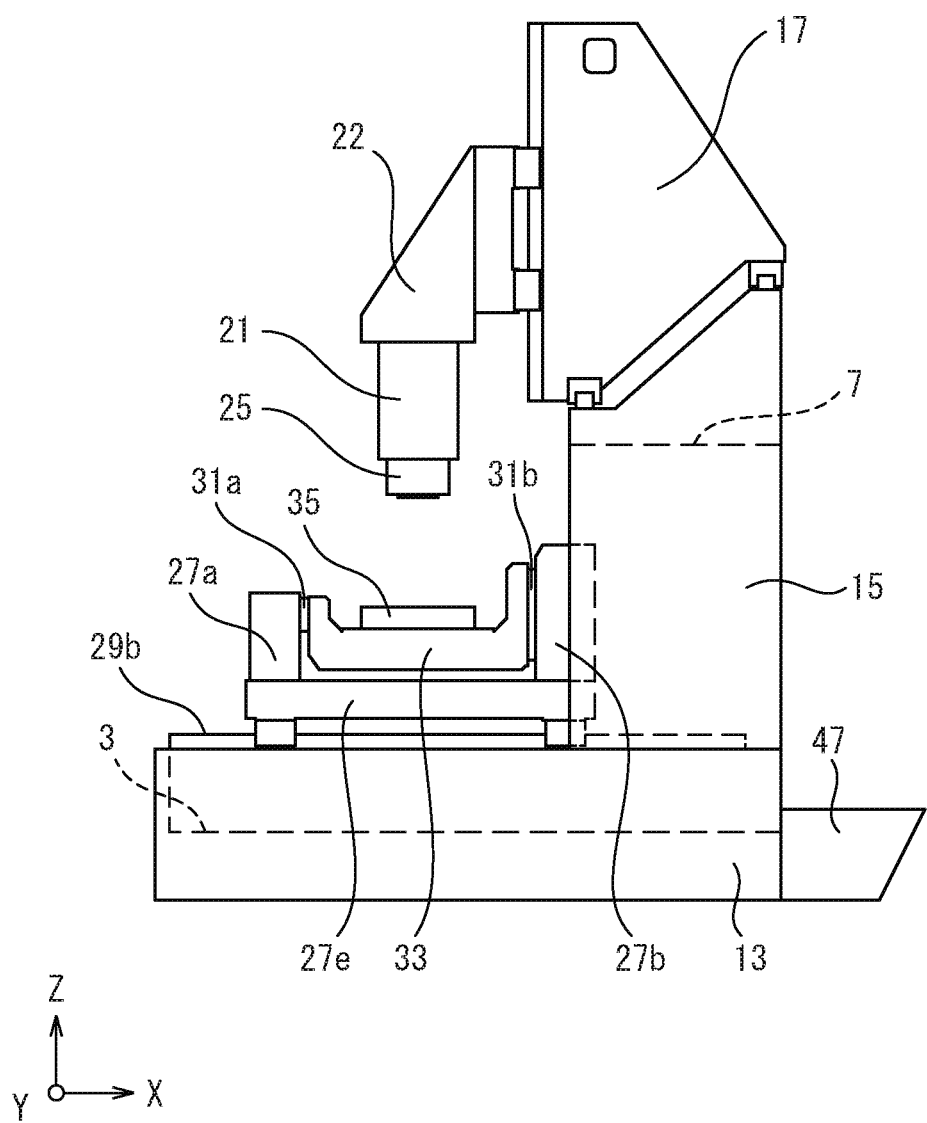
FIG. 5 is a front view of a machine tool according to an embodiment of the present invention.

In the embodiment of FIG. 3, the moving body 27 is composed of the left side first beam member 27c, the right side second beam member 27d, and the front and rear connecting members 27e and 27e which connect the first beam member 27c and the second beam member 27d. In contrast thereto, in another embodiment of FIG. 4, the front connecting member 27e does not exist. In this case, since the cavity H on the near side can be made wider, the dischargeability of the swarf and the accessibility of the operator are improved. Thus, the connecting members 27e are not limited to multiple members, and even a configuration in which the first beam member 27c and the second beam member 27d are linked by a single connecting member as shown in FIG. 4 is encompassed by the present invention. The connecting member 27e should be mounted on the top portion of the first X-axis guide 29a. The other configurations are the same as in the embodiment of FIG. 3.

Note that the technical scope of the present invention is not limited to the embodiments described above, and includes various modifications to the embodiments within a range which does not deviate from the purpose of the present invention. In other words, the specific configurations described in the embodiment are merely exemplary, and can be appropriately changed.

REFERENCE SIGN LIST

3 Trough
11 Machine Tool
13 Bed
15 Column
17 Saddle
19a First Y-axis Guide
19b Second Y-axis Guide
21 Spindle Head
22 Head stock
25 Spindle
27 Moving Body
27a Support
27b Support
27c First Beam Member
27d Second Beam Member
27e Connecting Member
33 Cradle
35 Rotary Table?

The invention claimed is:

1. A machine tool for machining a workpiece by performing relative rotation of a tool and the workpiece, comprising:
a trough provided in a bed, elongating in a longitudinal direction thereof, and configured to collect swarf;
a moving body which is located above the trough, moves on the bed in the longitudinal direction of the trough, comprises a first beam member, a second beam member, and a connecting member connecting the first and second beam members, and has a through-hole penetrating the moving body from a top surface thereof to a bottom surface thereof;
a first guide which is arranged on the bed in parallel to the longitudinal direction of the trough to guide the moving body in the longitudinal direction of the trough;
a second guide which is arranged on the bed in parallel to the longitudinal direction of the trough and opposed to the first guide with respect to the trough, to guide the moving body in the longitudinal direction of the trough; and
a cradle including a workpiece table, the cradle being supported at both ends thereof by pivot shafts that are provided on the first beam member and the second beam member so as to be rotatable inside the through-hole of the moving body about an axis which is parallel to the longitudinal direction of the trough,
wherein the connecting member comprises a first connecting portion and second connecting portion, and
the first beam member, the second beam member, and the first and second connecting portions of the movable body are formed into a rectangular shape surrounding the through-hole.

2. The machine tool of claim 1, wherein the pivot shafts of the cradle are supported by the first beam member and the second beam member so as to be offset toward a side opposite an operator with respect to the center of the trough in the longitudinal direction of the trough.

3. The machine tool of claim 1, wherein a linear feed axis drive mechanism configured to drive the movable body is arranged on the bed between the first guide or the second guide and the trough.

4. The machine tool of claim 1, further comprising a slant cover configured to guide swarf of a workpiece generated by a tool into the trough and covering a linear feed axis drive mechanism, the first guide, and the second guide.

* * * * *